W. J. O'LEARY.
CLUTCH FOR MOTORS AND THE LIKE.
APPLICATION FILED SEPT. 5, 1919.

1,395,289.

Patented Nov. 1, 1921.

Inventor
William J. O'Leary
By Attorney
George Ramsey

UNITED STATES PATENT OFFICE.

WILLIAM J. O'LEARY, OF MONTREAL, QUEBEC, CANADA, ASSIGNOR TO MARGUERITE VERNANDEZ O'LEARY, OF MONTREAL, QUEBEC, CANADA.

CLUTCH FOR MOTORS AND THE LIKE.

1,295,289.    Specification of Letters Patent.    Patented Nov. 1, 1921.

Application filed September 5, 1919. Serial No. 321,913.

*To all whom it may concern:*

Be it known that I, WILLIAM J. O'LEARY, a subject of the King of England, residing at Montreal, Quebec, Dominion of Canada, have made certain new and useful invention in Improvements in Clutches for Motors and the like of which the following is a specification.

This invention relates broadly to clutches and more particularly to an interlocking selective clutch.

The principal object of the present invention is an interlocking clutch of simple construction adapted to comprise interlocking parts which are so constructed as to coöperate only one with the other, and with each part of the clutch permanently secured to its respective shaft in such manner as not to be removable without destructive effort.

Another object of the present invention is a safety and selective clutch of the character specified wherein the parts are constructed to be snapped together and to comprise a clutch having one portion formed of resilient material and another portion adapted to be clamped upon the resilient material in such manner as to compress the said material and obviate any looseness in the connection between the parts.

A still further object of the present invention is a selective clutch comprising a resilient member and a metal disk or the like provided with clamping arms, the metal disk having the central portion under compression in such manner that the disk may be cupped or snapped to either side of a predetermined plane, and the center of the disk will tend to remain cupped in the direction to which it has been forced.

A still further object of the present invention is a selective clutch comprising a resilient member of leather, felt, or the like, and a metal disk or the like provided on its periphery with engaging arms adapted to be clamped upon the resilient member, said disk having the central portion under compression whereby the central portion may be snapped into a concave or convex position relatively to said arms, and whereby the said arms are open and separated when the disk is convex, and the said arms are closed and substantially in contact when the disk is concave.

A still further object of the present invention is a safety clutch of the character specified adapted to comprise a tightly interlocked clutch having a sound-deadening portion constructed to avoid the transmission of vibrations through the clutch.

Other and further objects of the present invention will in part be obvious and will in part be pointed out hereinafter in the specification following by reference to the accompanying drawings forming a part of the present specification. The drawings submitted herewith show one embodiment of the present invention. However, it is to be understood the invention may be embodied in constructions other than those herewith illustrated. Throughout the drawings like parts are designated by like characters.

Certain types of motors are adapted to work more economically and more satisfactorily with certain apparatuses which the motors are particularly constructed to drive. This is especially true of the type of vibration motor shown in McDonald Patent No. 1,250,914, December 18, 1918, and Patent No. 1,290,264, January 7, 1919. It has been found that where this type of motor has been connected with devices having moving parts which had rotative characteristics different from the device for which these motors were designed, that the motors were unsatisfactory in their operation and that therefore it was found desirable to provide connections between this type of motors and the devices they were intended to drive, which connections were of a selective type. By selective type it is meant that the connections shall be so constructed as to be interlocked with predetermined interlocking members only. In arrangement one portion of the clutch may be permanently secured to the motor shaft and the other portion of such connector may be permanently secured to the shaft of the driven device, the securing means in both cases being of such character that neither of the connector or clutch devices could be removed without being destroyed. Such an arrangement substantially insures the motor device will not be used for purposes other than those for which it is intended.

In the use of small motors, particularly household motors and the like, it is specially desirable that the connecting devices shall be simple in operation and construction, at the same time shall be of such construction as to be easily and quickly operated. The majority of electric motors operate with more or less vibration and if such motors are connected with loosely arranged clutch members the vibration produces undesirable noises and communicates undesirable shocks to the machine being driven. The present invention therefore also contemplates a construction wherein such vibration is stopped at the clutch and is not transmitted to the driven device.

Figure 1:
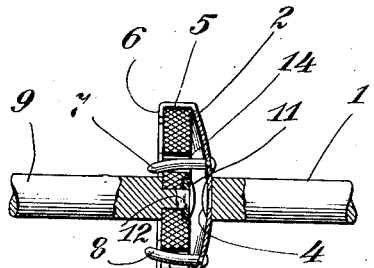
Figure 1 is a cross-section through a clutch embodying the present invention.
Figure 2:
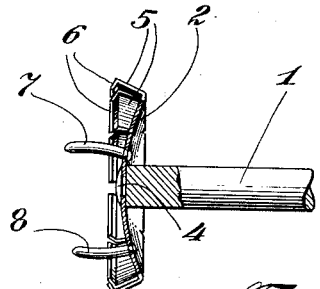
Fig. 2 shows a cross-section of the clamping portion of the clutch in its open position.
Figure 3:
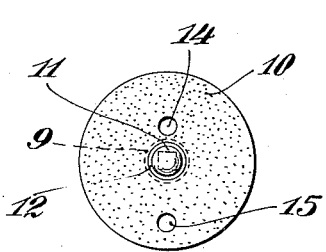
Fig. 3 is an end view of the resilient member of the clutch.
Figure 4:
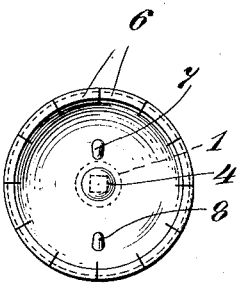
Fig. 4 is an end view of the clamping member of the clutch in closed position.
Figure 5:
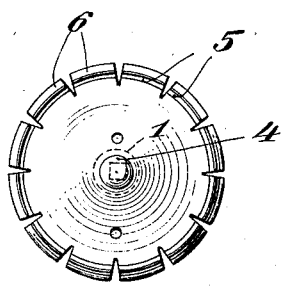
Fig. 5 is an end view of the clamping member of the clutch in open position.

Referring now to the drawings, which illustrate one embodiment of my invention, the driving shaft 1, which preferably is the shaft of a motor of the character specified, carries a cupped disk 2, which may be attached to the motor shaft by means of a suitable squared shoulder and a rivet in the head 4, or by any other permanent attaching means so that it is substantially impossible to remove the cupped disk 6 without destroying the same. This cupped disk is constructed with the central portion under compression so that the disk has a tendency to snap into and retain either a concave or convex position, dependent upon which way the central portion or disk has been forced. The edge of the disk carries a plurality of arms 5 having interlocking members 6. When the disk is convex the arms are open, as shown in Figs. 2 and 5, and when the disk is concave the arms are closed, as is shown in Figs. 1 and 4. Preferably the disk 2 carries a pair of interlocking pins 7 and 8. These pins may be slightly curved and preferably are located at different distances from the axis of the shaft 1.

The driven shaft 9 carries a resilient member 10 which preferably is mounted upon a squared head on the shaft 9 and the end of the shaft 9 is riveted as at 11 permanently over a washer 12, or the resilient member 10 may be secured to the driven shaft 9 by any other construction which will prevent the removal of the member 10 without destroying the same. This resilient member 10 may be made of spongy leather or felt or similar materials so that the arms 5 may tightly clamp down upon the same and provide a good driving connection. This member 10 is provided with openings 14 and 15 which are adapted to receive the pins 7 and 8 respectively. The arrangement of the pins 7 and 8 and the openings 14 and 15 is such that the shaft 1 may only be interlocked with the shaft 9 in a predetermined rotative position and furthermore provide selective means whereby a predetermined clutch disk 2 may only be interlocked with a predetermined resilient member 10 having openings constructed to correspond with the relation of the pins 7 and 8. The flexibility of the member 10 also permits the construction which automatically takes care of the alinement between the shafts 1 and 9 within such limits as are ordinarily required for mounting household motors.

Figure 6:
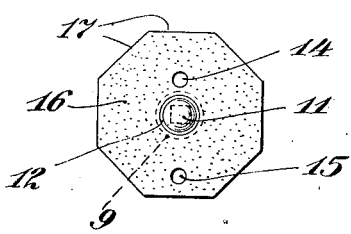
Fig. 6 is an end view of a slightly different shaped resilient member of the clutch.
Figure 7:
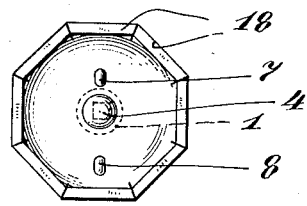
Fig. 7 is an end view of the type of clamping member adapted to coöperate with the resilient member shown in Fig. 6.

In Figs. 6 and 7 the resilient member 16 is shown as being provided with octagonal faces 17 and the cupped disk is shown with octagonally arranged arms 18. This modified construction permits more positive driving engagement between the arms 18 and the resilient member 16.

In operation it is clear that when the disk 2 is convex and the arms are open, that by placing the resilient member against the disk and applying force to the edge of the disk, toward the resilient member and parallel to the axis of the shaft, the disk will snap into the position shown in Fig. 1, with the arms engaging the edge of the resilient pad to provide a driving connection. A force in the opposite direction causes the arms to open and the parts to unlock.

The foregoing shows that the construction described provides a selective clutch which provides a cushioned connection between a driving shaft and a driven member.

Having thus described my invention, what I claim is:

1. A clutch of the character specified comprising a clamping member having a disk with the middle of the disk under compression so that the disk at all times tends to maintain a cupped position, a plurality of engaging members operatively connected with said disk in such manner as to be opened when the disk is cupped in one direction and as to be closed when the disk is cupped in the other direction, and means comprising a compressible disk adapted to be clamped within said engaging members in such manner as to transmit rotative forces from the said disk.

2. A clutch of the character specified comprising a clamping member having a disk with the middle of the disk under compression so that the disk at all times tends to maintain a cupped position, a plurality of engaging members operatively connected with said disk in such manner as to be opened when the disk is cupped in one direction and as to be closed when the disk is cupped in the other direction, means adapted to be clamped within said engaging members in such manner as to transmit rotative forces from the said disk, and selective means of predetermining the rotative relation of the connected parts.

3. A clutch of the character specified comprising a clamping member having a disk with the middle of the disk under compression so that the disk at all times tends to maintain a cupped position, a plurality of engaging members operatively connected to move with the periphery of said disk in such manner as to be opened when the disk is cupped in one direction and as to be closed when the disk is cupped in the other direction, and means comprising a compressible disk adapted to be clamped within said engaging members in such manner as to transmit rotative forces from the said disk.

4. A clutch of the character specified comprising a clamping member having a disk with the middle of the disk under compression so that the disk at all times tends to maintain a cupped position, a plurality of engaging members operatively connected to move with the periphery of said disk in such manner as to be opened when the disk is cupped in one direction and as to be closed when the disk is cupped in the other direction, means adapted to be clamped within said engaging members in such manner as to transmit rotative forces from the said disk, and selective means of predetermining the rotative relation of the connected parts.

5. A clutch of the character specified comprising a clamping member having a disk with the middle of the disk under compression so that the disk at all times tends to maintain a cupped position, a plurality of engaging members operatively connected to move with the periphery of said disk in such manner as to be opened when the disk is cupped in one direction and as to be closed when the disk is cupped in the other direction, means comprising a compressible disk adapted to be clamped within said engaging members in such manner as to transmit rotative forces from the said disk, and selective means of predetermining the rotative relation of the connected parts.

6. A clutch of the character specified comprising in combination a cupped disk having the middle portion under compression whereby said disk tends to remain cupped on either side of the median plane dependent upon the direction in which pressure was last applied to the middle of the disk, a plurality of arms carried by the disk and having overlocking extensions on the outer ends of the arms, and resilient means adapted to be engaged and inclosed by said arms when the clutch is arranged to transmit power.

7. A clutch of the character specified comprising in combination a cupped disk having the middle portion under compression whereby said disk tends to remain cupped on either side of the median plane dependent upon the direction in which pressure was last applied to the middle of the disk, a plurality of arms integral with and attached to the periphery of the disk, overlocking extensions on the outer ends of the arms, and resilient means adapted to be engaged and inclosed by said arms when the clutch is arranged to transmit power.

8. A clutch of the character specified comprising in combination a cupped disk having the middle portion under compression whereby said disk tends to remain cupped on either side of the median plane dependent upon the direction in which pressure was last applied to the middle of the disk, a plurality of arms carried by the disk, and having overlocking extensions on the outer ends of the arms adapted to prevent disengagement of the parts, and resilient means adapted to be engaged and inclosed by said arms when the cluch is arranged to transmit power, said resilient means substantially filling the space inclosed by said arms and said overlocking extensions.

9. A clutch of the character specified comprising in combination a cupped disk having the middle portion under compression whereby said disk tends to remain cupped on either side of the median plane dependent upon the direction in which pressure was last applied to the middle of the disk, a plurality of arms integral with and attached to the periphery of the disk, overlocking extensions on the outer ends of the arms adapted to prevent the disengagement of parts, and resilient means adapted to be engaged and inclosed by said arms when the clutch is arranged to transmit power, said resilient means substantially filling the space inclosed by said arms and said overlocking extensions.

10. A clutch of the character specified comprising a member having a portion thereof cupped and under compression in such manner that the side toward which the cup extends is dependent upon the direction in which pressure was last applied to the said member, devices carried by the said member and being operated by the cupping action of the said member whereby said devices are open when the member is cupped in one direction and closed when the member is cupped in the other direction, in combination with means upon which said devices are operative by peripheral engagement to provide a clutch adapted to transmit power, and selective devices adapted to interfit in a predetermined relationship.

11. A clutch member of the character specified comprising the combination of a shaft, a cupped disk being attached to said shaft, a part of said disk being under compression whereby said disk tends to remain cupped in either direction dependent upon the direction in which pressure was last applied to the disk, arms integral with said disk, said arms being open when the disk is concave in one direction, said arms being closed when the disk is concave in the other direction, and selector pins carried by said disk.

12. A clutch of the character specified comprising the combination of a shaft, a cupped disk being attached to said shaft, a part of said disk being under compression whereby the disk tends to remain cupped in either direction dependent upon the direction in which pressure was last applied to said disk, arms integral with said disk, said arms being open when the disk is concave in one direction, said arms being closed when the disk is concave in the other direction, selector pins carried by said disk, and a member coöperative with said arms when the clutch is operative.

13. A clutch of the character specified comprising the combination of a shaft, a cupped disk being attached to said shaft, a part of said disk being under compression whereby the disk tends to remain cupped in either direction dependent upon the direction in which pressure was last applied to said disk, arms integral with said disk, said arms being open when the disk is concave in one direction, said arms being closed when the disk is concave in the other direction, selector pins carried by said disk, and a member coöperative with said arms when the clutch is operative, said member being provided with openings to receive said pins.

WILLIAM J. O'LEARY.